United States Patent [19]

Mathues

[11] 3,926,476
[45] Dec. 16, 1975

[54] DUAL MASTER CYLINDER INCLUDING A PLURALITY OF PROPORTIONING VALVES LOCATED WITHIN PRESSURIZING PISTONS

[75] Inventor: Thomas P. Mathues, Miamisburg, Ohio

[73] Assignee: General Motors Corporation, Detroit, Mich.

[22] Filed: Feb. 10, 1975

[21] Appl. No.: 548,355

[52] U.S. Cl. ............... 303/6 C; 60/582; 188/151 A; 188/349; 200/82 D; 303/52
[51] Int. Cl.² .................. B60T 13/00; B60T 17/18
[58] Field of Search ............ 60/534, 535, 572, 582, 60/592; 303/6 C, 6 R, 84, 52; 188/349, 151 A, 345; 200/82 D, 82 R, 81.9 R; 340/52 C

[56] References Cited
UNITED STATES PATENTS

| | | | |
|---|---|---|---|
| 3,220,188 | 11/1965 | Stelzer | 303/6 C X |
| 3,368,651 | 2/1968 | Lepelletier | 303/6 C X |
| 3,627,385 | 12/1971 | Stokes | 303/6 C |
| 3,686,864 | 8/1972 | Shutt | 60/534 |
| 3,712,683 | 1/1973 | Keady et al. | 60/535 X |
| 3,738,709 | 6/1973 | Stokes | 303/6 C |
| 3,817,583 | 6/1974 | Blakey | 303/6 R |
| 3,852,962 | 12/1974 | Warwick | 60/535 X |

Primary Examiner—Trygve M. Blix
Assistant Examiner—Douglas C. Butler
Attorney, Agent, or Firm—D. D. McGraw

[57] ABSTRACT

A dual master cylinder having a primary piston and secondary piston mounted in series. A pair of proportioning valve assemblies are provided, one assembly being located in each secondary piston extension, a bore provided through the secondary piston for this purpose. The proportioning valve assembly in a rearward extension is arranged to proportion fluid pressure from a chamber serving the right front brake to a chamber, which may serve the left rear brake. The other proportioning assembly is responsive to pressures in a set of other pressurizing chambers to apply pressure to the left front brake and the right rear brake. The proportioning valve assemblies are combined with a fail-safe assembly responsive to a pressure loss to signal the operator and to deactivate one of the proportioning valves.

3 Claims, 3 Drawing Figures

DUAL MASTER CYLINDER INCLUDING A PLURALITY OF PROPORTIONING VALVES LOCATED WITHIN PRESSURIZING PISTONS

The invention relates to a master cylinder assembly and more particularly to one in which a pair of proportioning valve mechanisms are provided in the secondary piston of a dual piston master cylinder arranged to have four separate pressurizing chambers. One pressurizing chamber is connected to each of the four vehicle brakes so that adjacent chambers having pressures acting on one proportioning valve mechanism are connected to diagonally opposite brakes. It is a feature of the invention to have each of the proportioning valve mechanisms proportion pressure from a front brake pressurizing chamber to a rear brake pressurizing chamber at a pressure ratio established to begin proportioning at some predetermined pressure differential. Another feature of the invention is the deactivation of the proportioning action of one proportioning valve mechanism when a pressure loss has occurred in either of the brake conduits served by either of the pressurizing chambers associated with the other proportioning valve mechanism. This arrangement permits full brake actuating pressure to be delivered to the rear brake remaining in operation as well as the front brake which is diagonally opposite that rear brake.

The proportioning mechanisms are closely related to the mechanism disclosed in U.S. Pat. No. 3,733,106, issued May 15, 1973, entitled "Combination Valve Assembly With Proportioner Override" and assigned to the common assignee. That patent discloses a combination valve mechanism including a proportioning section, a pressure failure warning section and a metering section.

IN THE DRAWING

Figure 1:
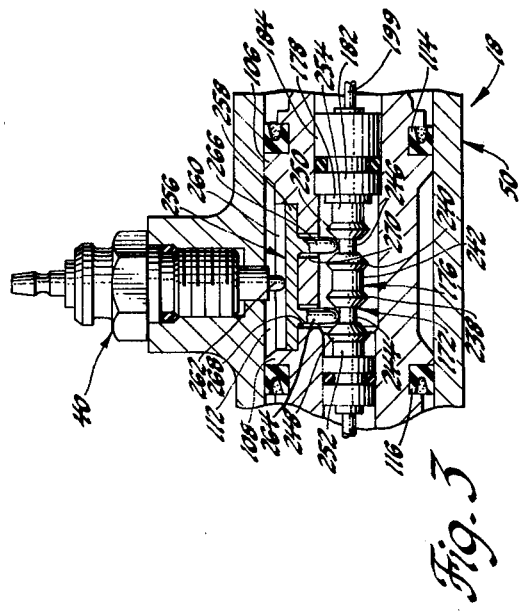
FIG. 1 is a schematic representation of a dual circuit brake system for a vehicle utilizing a master cylinder assembly embodying the invention.

The system illustrated in FIG. 1 includes a brake pedal 10 suitably mounted on a portion 12 of a vehicle so as to transmit braking effort through the push rod 14 to the brake booster 16. The master cylinder assembly 18 embodying the invention is actuated by the booster 16 in the usual manner. The master cylinder assembly is of the dual pressurizing chamber type arranged to provide brake actuating fluid to four separate brake circuits, one for each wheel brake of a four-wheeled vehicle. The front brake circuits 20 include brake lines 22 and 23 which respectively lead from the master cylinder assembly outlets 24 and 25 to the vehicle left front wheel brake 26 and the right front wheel brake 28. The rear brake circuits 30 include brake lines 32 and 33 which respectively connect the master cylinder assembly outlets 34 and 35 with the right vehicle rear wheel brake 36 and the left vehicle rear wheel brake 38. The master cylinder assembly 18 has a warning switch assembly 40 which is in an electrical circuit schematically illustrated as including an electrical lead 42 containing in series with warning switch assembly 40 a switch 44, a warning signal lamp 46, and a source of electrical energy such as battery 48.

Figure 3:
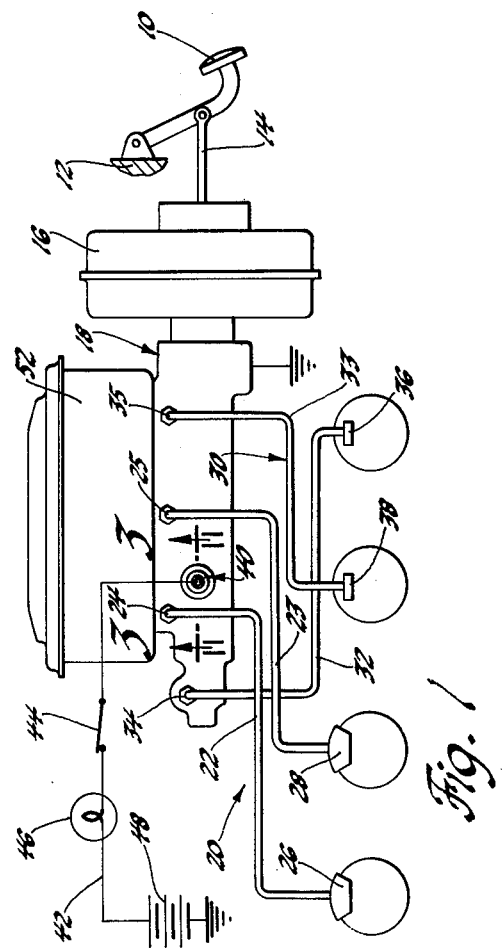
FIG. 3 is a fragmentary cross section view of a portion of the master cylinder assembly as taken in the direction of arrows 3—3 of FIG. 1.
Figure 2:
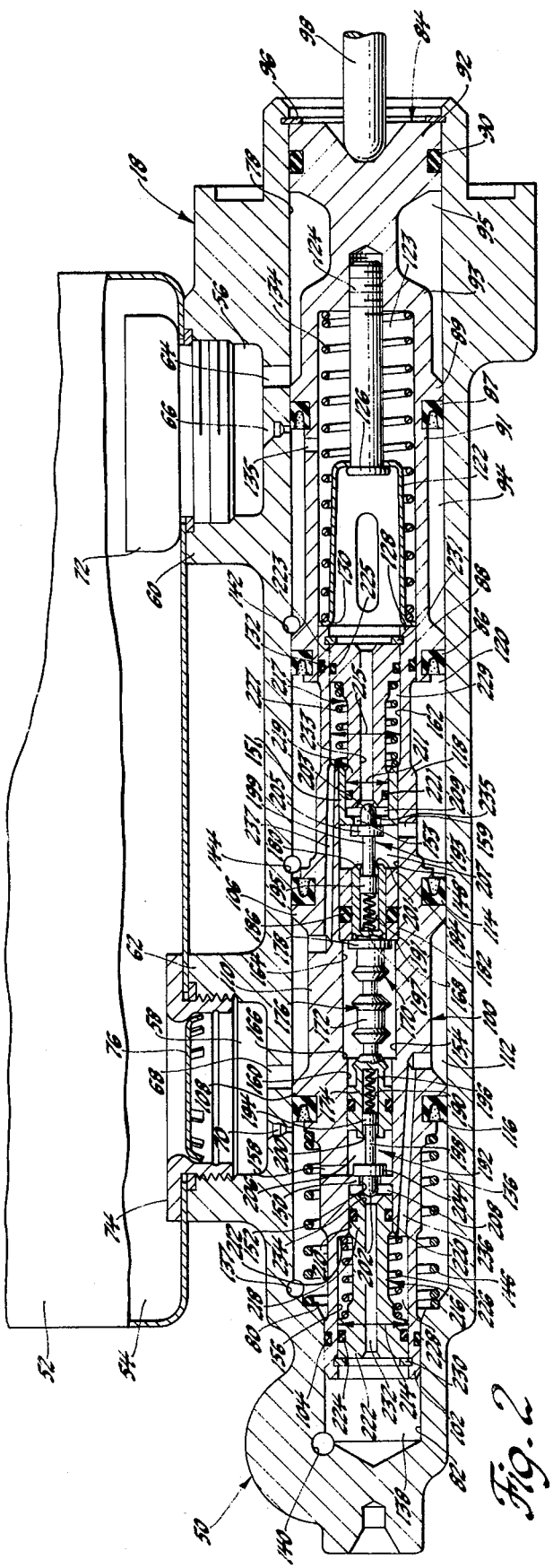
FIG. 2 is a cross section view of the master cylinder assembly utilized in the system of FIG. 1, with parts broken away.

The master cylinder assembly 18 is illustrated in greater detail in FIGS. 2 and 3. The assembly is generally comprised of a master cylinder housing 50 on which a fluid reservoir housing 52 is secured. The reservoir portion of assembly 18 has a primary reservoir chamber 54 formed by housing 52, and first and second secondary reservoir chambers 56 and 58 respectively formed in bosses 60 and 62 on the upper side of the master cylinder housing 50. The bottoms of these secondary reservoir chambers are respectively provided with compensation ports 64 and 66, and 68 and 70. Tubular member 72 is threaded into the first secondary reservoir chamber 56 and acts as a retaining member for reservoir housing 52. Another tubular member 74 is threaded into the second secondary reservoir chamber 58 and also acts as a retainer for reservoir housing 52. An apertured baffle plate 76 is fitted within tubular member 74 to provide a tortuous flow path for fluid from the primary reservoir chamber 54 to compensation ports 68 and 70. The baffle plate also prevents fluid which may squirt through port 70 upon brake actuation from being propelled directly into the primary reservoir chamber 54. The reservoir construction is disclosed and claimed in greater detail in U.S. patent application Ser. Nos. 462,335 and 462,355, which were filed Apr. 19, 1974, each entitled "Master Cylinder Assembly and Reservoir For Same."

Housing 50 has a main bore 78 therein with the forward end of the main bore having a shoulder 80 leading to the bore reduced diameter section 82. The compensation ports 64 and 66, and 68 and 70, connect the reservoir chambers 56 and 58 with the main bore 78. A first pressurizing piston 84 is reciprocably received in rear portion of main bore 78. It is provided with piston cups 86 and 87 on the piston forward land 88 and center land 89, a seal 90 on the piston rear land 92. The lands 88, 89 and 92, with the reduced diameter portions 91 and 93 of the piston joining these lands, cooperate with a portion of main bore portion 78 to define a portion 94 of a first fluid pressurizing chamber and a first reservoir connected cavity 95. Cavity 95 is always connected through port 64 with reservoir chamber 56. A piston stop 96 is provided in the rear end of main bore 78 to locate the piston 84 in its brake release position and to retain it in the bore. The push rod 98 is the output member of the booster 16. The rod is suitably positioned in a socket formed in the rear wall of piston 84 so that the piston may be moved leftwardly as seen in FIG. 2 when the master cylinder assembly is being actuated.

A secondary pressurizing piston 100 is also reciprocably received in main bore 78 and has a reduced diameter forward extension 102 which extends into the main bore reduced diameter section 82. A seal 104 on extension 102 slidably seals the piston relative to bore section 82. The piston also has axially spaced lands 106 and 108 joined by a reduced diameter section 110 so as to define with main bore 78 another reservoir connected cavity 112. This cavity is always connected with reservoir chamber 58 through port 68. V-block seals 114 and 116 are respectively provided on lands 106 and 108 to seal against any fluid pressure flow from other portions of the main bore into cavity 112. The secondary piston also has a reduced diameter rearward extension 118. Extension 118 is located in and extends through the second fluid pressurizing chamber 120 which is defined by the main bore 78 and the primary and secondary pistons 84 and 100. A caging mechanism providing a piston location and return spring arrangement includes the spring retainer 122 reciprocably mounted within the recess 123 of primary piston 84. The headed bolt 124, with its head 126, is secured in the inner end of recess 123 and provides the mounting for retainer 122. The retainer 122 is generally hat-shaped, and abuts end 128 of extension 118 by means of the retainer flange 130. Extension 118 is slidably fitted into recess 123 and has a seal 132 which seals the chamber 120 relative to the recess 123. Spring 134 is a compression spring having one end acting on flange 130 of retainer 122 and the other end acting on the end of recess 123 so as to be caged between them. When the master cylinder assembly is in the brake release position illustrated, the compressive force stored in spring 134 extends the retainer 122 on bolt 124 to engage bolt head 126 as shown in the drawing to establish a precise location for the secondary piston 100. Recess 123 is functionally a part of chamber 94, and is connected therewith through passage 135 formed in portion 91 of the first pressurizing piston 84. Chamber portion 94 and recess 123 combine to define the first fluid pressurizing chamber.

The secondary piston land 108 cooperates with the main bore 78 and shoulder 80 to define a third fluid pressurizing chamber 136. Chamber 136 is annular, being formed about secondary piston extension 102. When the master cylinder assembly is in the brake release position illustrated, compensation port 70 is adjacent but clear of seal 116. As is well known in the art, slight brake actuating movement of secondary piston 100 will cause seal 116 to close the compensation port so that fluid may be pressurized in chamber 136. Outlet passage 137 is fluid connected with outlet 24 and with the third fluid pressurizing chamber 136 adjacent shoulder 80. The fourth fluid pressurizing chamber 138 is defined by bore reduced diameter section 82 and the extension 102 of secondary piston 100. An outlet passage 140 leads to outlet 34 to which the right rear brake 32 is connected. Passage 140 is fluid connected with chamber 138.

Compensation port 66 is also positioned immediately adjacent but clear of seal 87 when the assembly is in the brake release position, and is closed by slight brake actuating movement of primary piston 84 so that fluid may be pressurized in the first fluid pressurizing chamber 94. Outlet passage 142 is fluid connected with pressurizing chamber portion 94 slightly rearwardly of the brake release position of secondary piston land 88. Passage 142 is connected to the outlet 35. Similarly, outlet passage 144 is fluid connected with outlet 25 and with the second fluid pressurizing chamber 120 slightly rearwardly of the brake release position of secondary piston seal 114. Thus fluids in the first pressurizing chamber 94, 123 and in the fourth pressurizing chamber 138 are pressurized to actuate the vehicle rear brakes 38 and 36 through their respective lines 33 and 32, and fluids pressurized in second and third pressurizing chambers 120 and 136 individually actuate the front brakes 26 and 28. Upon brake release the secondary piston return spring 146, located in chamber 136 and having one end acting on shoulder 80 and the other end acting on secondary piston land 108, urges the secondary piston rearwardly. It also acts through return spring 134 and joins with the expanding action of that spring to urge primary piston 84 rearwardly. This permits all of the pressurizing chambers to expand and return to the brake release position shown in the drawing.

A bore 148 is formed through secondary piston 100, with a wall 150 being provided in the bore and having an aperture 152 therethrough. The wall 150 divides bore 148 into a first bore section 154 and a second bore section 156. A passage 158 in the secondary piston provides fluid communication between chamber 136 and bore section 154 immediately adjacent wall 150. The bore section 154 has stepped diameters with the smallest diameter portion 160 being adjacent wall 150, the largest diameter portion 162 being at the other end of bore section 154 and opening into recess 123, and the intermediate diameter portion 164 being positioned axially between diameter portions 160 and 162 and respectively connecteed therewith at shoulders 166 and 168. A shuttle piston assembly 170 is positioned in bore section 154 for reciprocal movement in either direction from the center position illustrated in the drawing. The piston assembly 170 includes a piston body 172 having a land 174 at one end, a camming section 176 of reduced diameters relative to the diameter of land 174, a flange 178, and a piston end 180 of smaller diameter than the diameter of flange 178. The shuttle piston assembly 170 also includes a pair of sleeves or collars 182 and 184 which are slidably positioned over piston end 180. Sleeve 182 may abut flange 178 and is separated from sleeve 184 by a seal 186 which seals against the wall of the bore section 154 having the largest diameter 162 as well as the cylindrical surface of piston end 180.

The end of piston body 172 adjacent land 174 is provided with a recess 190 opening into the portion 160 of bore section 154 having the smallest diameter and axially intermediate land 174 and wall 150. A similar recess 191 in piston end 180 opens into the portion 162 of bore section 154 having the largest diameter. A proportioner stem 192 has a fluted end 194 reciprocably received in recess 190 and engaging a light spring 196 within that recess. The portion of the recess containing spring 196 is pressure relieved by the fluted construction of stem end 194. The stem body 198 is of a slightly reduced diameter relative to fluted end 194 so that the piston recess opening is staked at 200 to prevent removal of the proportioner stem while permitting a lost motion or telescoping movement of the stem relative to piston body 172. A similar proportioner stem 193 has a fluted end 195 reciprocably received in recess 191 and engaging a light spring 197 within that recess. The portion of the recess containing spring 197 is pressure relieved by the fluted construction of stem end 195. The stem body 199 is of a slightly reduced diameter relative to fluted end 195 so that the piston recess opening is staked at 201 to prevent removal of the proportioner stem while permitting a lost motion or telescoping movement of the stem relative to piston body 172. A cup-like retainer 151 having an aperture 153 is press fitted into bore portion 162. It acts as a retainer for the shuttle valve assembly 170 and is also a part of a proportioner valve assembly to be further described.

The proportioner stem 192 has a valve end 202 extending through aperture 152 of wall 150 with sufficient clearance to permit fluid flow and pressure transmittal therethrough in a substantially unrestricted manner. The proportioner stem 192 may have a flange 204 formed on the center portion of the stem body and positioned in the chamber 206 formed by the piston body 172, wall 150, and the smallest diameter portion 160 of bore section 154. If this flange is used, the edge or the side facing wall 150 is fluted so as not to restrict fluid flow through aperture 152 even when the flange abuts the wall. The proportioner stem valve end 202 extends into a chamber 208 on the other side of wall 150 from chamber 206. This chamber is provided in an end of second bore section 156 having a reduced diameter 210. A shoulder 212 separates the reduced diameter portion of second bore section 156 from the larger diameter portion opening into chamber 138 and having a larger diameter 214.

A proportioner piston 216 is reciprocably received in the second bore section 156 of secondary pressurizing piston 100 and has a smaller diameter end land 218 provided with a seal 220 which seals the land relative to the smaller diameter portion of bore section 156. A larger diameter land 222 is provided with a seal 224 and fits in reciprocable sealing relation with the larger diameter portion of bore section 156. A proportioner spring 226 is compressed between land 222 and shoulder 212 in the annular spring cavity 228. The left end of land 222 is in abuttable relation with a stop 230 provided in the outer end of second bore section 156. A through passage 232 is axially formed in piston 216 to provide fluid communication between chambers 208 and 138. The end of passage 232 opening into chamber 208 provides a valve seat 234 which cooperates with valve end 202 for fluid pressure proportioning action to be described. In the brake release position illustrated, proportioner piston 216 abuts stop 230 and there is sufficient clearance between the valve end 202 and the valve seat 234 to permit substantially unrestricted flow between chamber 208 and chamber 138 through passage 232. A secondary piston passage 236 provides continuous fluid communication between spring cavity 228 and the reservoir connected cavity 112.

The proportioner stem 193 has a valve end 203 extending through aperture 153 of retainer 151 with sufficient clearance to permit fluid flow and pressure transmittal therethrough in a substantially unrestricted manner. The proportioner stem 193 may have a flange 205 formed on the center portion of the stem body and positioned in the chamber 207 formed by the piston body 172, collar 184, retainer 151, and the largest diameter portion 162 of bore section 154. If this flange is used, the edge or the side facing retainer 151 is fluted so as not to restrict fluid flow through aperture 153 even when the flange abuts the retainer. The proportioner stem valve end 203 extends into a chamber 209 on the other side of retainer 151 from chamber 207. This chamber is provided in the inner end of retainer 151 having a diameter 211. A shoulder 213 formed by the outer end of the retainer 151 separates the diameter 211 portion of first bore section 154 from the larger diameter portion 162 opening into recess 123 and having a larger diameter 215.

A proportioner piston 217 is reciprocably received in the bore portion 162 of secondary pressurizing piston 100 and has a smaller diameter end land 219 provided with a seal 221 which seals the land relative to the smaller diameter portion 211 of retainer 151. A larger diameter land 223 is provided with a seal 225 and fits in reciprocable sealing relation with the larger diameter portion 162 of bore section 154. A proportioner spring 227 is compressed between land 223 and shoulder 213 in the annular spring cavity 229. The right end of land 223 is in abuttable relation with a stop 231 provided in the outer end of second bore section 154. A through passage 233 is axially formed in piston 217 to provide fluid communication between chambers 209 and 123. The end of passage 233 opening into chamber 209 provides a valve seat 235 which cooperates with valve end 203 for fluid pressure proportioning action to be described. In the brake release position illustrated, proportioner piston 217 abuts stop 231 and there is sufficient clearance between the valve end 203 and the valve seat 235 to permit substantially unrestricted flow between chamber 209 and chamber 123 through passage 233. A secondary piston passage 237 provides continuous fluid communication between spring cavity 229 and the reservoir connected cavity 112.

As is better shown in FIG. 3, the piston camming section 176 of piston body 172 includes annular ridge-like cams 238 and 240 separated by a body section 242 having a first diameter smaller than the cams but larger than the body sections 244 and 246 on the opposite sides of the cams 238 and 240. Additional ridge-like cams 248 and 250 are spaced from the first mentioned cams by sections 244 and 246. On the other sides of cams 248 and 250 are additional body sections 252 and 254 which are of the same diameter as body section 242. A switch control bar 256 is provided in the recessed portion of secondary piston 100 between lands 106 and 108. Bar 256 has a body portion 258 provided with a channel 260 slidably receiving the plunger 262 of switch assembly 40. Bar legs 264 and 266 extend through passages 268 and 270 formed in the body of secondary piston 100 and into the bore section 154.

When the shuttle piston assembly 170 is in the central position shown in the drawing, the free ends of legs 264 and 266 ride on shuttle piston body sections 244 and 246 so that the bar body portion 258 is positioned radially inward of cavity 112 against the body of the secondary piston 100. If the shuttle piston is moved in either direction, for example rightwardly as seen in FIG. 3, legs 264 and 266, acting as cam followers, are forced up over cams 248 and 240 respectively, and engage the larger diameter body sections 252 and 242, respectively. This moves the bar body portion 258 radially outward in cavity 112, moving switch plunger 262 against its spring bias and closing the switch in switch assembly 40 to energize the warning lamp 46, assuming that switch 44, which may be the ignition switch, is closed. This movement would result from a pressure loss in chamber 207, which is the same pressure as that in chamber 120, or a pressure loss in recess 123, relative to the pressure in chamber 206, which is the same pressure as that in chamber 136. Passage 159 in secondary piston extension 118 provides continuous fluid communication between chambers 120 and 207. Rightward movement of piston body 172 will cause the proportioner stem 192 to move rightwardly and therefore move valve end 202 sufficiently far away from valve seat 234 so that no proportioning action can take place under influence of pressures acting on the proportioner piston 216. This then opens substantially unrestricted fluid communication between chambers 136 and 138, and full pressure is delivered to the left front and right rear brakes.

When the cause of the pressure loss is determined and repaired, actuation of the system will cause pressure generated in chamber 120 to act across the end of sleeve 184 as well as the piston end 180, generating a greater force leftwardly on the piston body 172 than that generated by the pressure in chamber 206 acting on the smaller effective area of piston land 174. The piston assembly 170 is therefore returned to the center position illustrated, with sleeve 182 abutting shoulder 168. Since the piston end 180 has a smaller effective area than piston land 174, no additional movement leftward occurs so long as the pressures in chambers 120 and 206 are substantially the same.

Pressure loss in chamber 206 during brake actuation will result from pressure loss in chamber 136 or 138. The pressure in second pressurizing chamber 120 will act on piston end 180 to move the shuttle piston body 172 leftwardly, and cams 238 and 250 will then lift bar 256 radially outward, the legs 264 and 266 resting on the larger diameter body portions 242 and 254. Switch assembly 40 is then again actuated. The lost motion connection of proportioner stem 192 and piston body 172 permits this movement without moving the proportioner stem. Spring 196 merely collapses. When the cause of the pressure loss has been determined and repaired, the piston body 172 will be returned to the center position illustrated by the differential force acting thereon created by pressure in chamber 206 acting on the larger area of land 174 as compared to the smaller area of piston end 180 on which pressure in chamber 120 acts.

During normal brake operation push rod 98 is moved leftwardly to move primary piston 84 leftwardly to pressurize brake fluid in first and second pressurizing chambers 123, 94 and 120. Some of the force exerted by push rod 98 is transmitted to the secondary piston 100 through spring 134. However, the major portion of the force is transmitted through the fluid in chamber 120 and recess 123. These forces move secondary piston 100 leftwardly as seen in FIG. 2 against the force of spring 146 and fluid is pressurized in chambers 136 and 138. At a predetermined pressure differential, the forces acting on proportioner piston 216 due to the differential areas exposed to chambers 136 and 138 will cause the piston 216 to move rightwardly against the force of spring 226, causing a proportioning action to take place between valve end 202 and valve seat 234. Thus the pressure from chamber 136 is proportioned into chamber 138 at a predetermined ratio once proportioning action begins. The effective areas of the secondary piston forming the movable walls of these chambers are so proportioned that fluid is pressurized at a higher rate in chambers 120 and 136 than in recess 123 and chamber 138 for a given leftward stroke of the pressurizing pistons during proportioning action. The net result is that proportionately less pressure is delivered to the right rear brake 36 than to the left front brake 26. It can be readily seen that with this arrangement the full available volume displacement of chambers 136 and 138 are utilized.

The forces acting on proportioner piston 217 due to the differential areas exposed to chamber 209 and recess 123 will cause piston 217 to move leftwardly against the force of spring 227, causing a proportioning action to take place between valve end 203 and valve seat 235. Thus the pressure from chamber 120 is proportioned into recess 123 and chamber 94 at a predetermined ratio once proportioning action begins. The net result is that proportionally less pressure is delivered to the left rear brake 38 than to the right front brake 28. The full available volume displacement of chamber 120 and recess 123 are utilized. The proportioner piston areas at their opposite ends are calculated to provide a desirable slope of proportioned pressure increase using the higher pressure as the upstream pressure. The pressure slope obtained at each of the rear brakes 36 and 38 is calculated by dividing the outlet pressure delivered to each of the front brakes by the outlet pressure delivered to each of the diagonally opposite rear brakes.

The arrangement herein disclosed and claimed is compact, with the proportioners and the shuttle piston being included in the master cylinder assembly with little change in weight or size. The secondary piston assembly can be preassembled with the proportioners and shuttle piston in it to provide a modular unit which can be pretested for switch actuating function, proportioner function, and sealability before it is installed in a master cylinder assembly. The arrangement provides better serviceability since the proportioners, shuttle piston, or the secondary piston itself can be serviced by replacing the secondary piston assembly with a pretested module. Since the proportioners and shuttle piston are vented internally and there are no external connections from the master cylinder to a separate combination valve body, external leak points are decreased. The arrangement also permits the use of common seals and bodies so that several pieces can be eliminated as compared to the use of a separate combination valve assembly.

What is claimed is:

1. In a vehicle brake system having a master cylinder assembly and front and rear wheel brakes and brake lines fluid connecting the master cylinder assembly and the vehicle wheel brakes to transmit brake actuating pressures therebetween, the master cylinder assembly comprising:

a housing having bore means therein and pressurizing piston means sealingly and reciprocably received in said bore means and cooperating therewith to define a plurality of brake fluid pressurizing chambers for pressurizing brake fluid when said master cylinder assembly is actuated to actuate the vehicle front wheel brakes through the brake lines connected therewith and additional pressurizing chambers for pressurizing brake fluid to actuate the vehicle rear wheel brakes through the brake lines connected therewith;

and a plurality of proportioning valve means mounted in said pressurizing piston means and responsive to some brake fluid pressures generated in said brake fluid pressurizing chambers when said master cylinder assembly is actuated to proportion the brake actuating pressures transmitted to the vehicle rear wheel brakes in relation to other brake fluid pressures generated in said brake fluid pressurizing chambers whereby the vehicle rear wheel brakes receive proportionately less brake actuating pressures than do the vehicle front wheel brakes above an effective predetermined pressure.

2. In a vehicle brake system having a master cylinder assembly and front and rear wheel brakes and brake lines fluid connecting the master cylinder assembly and the vehicle wheel brakes to transmit brake actuating pressures therebetween, the master cylinder assembly comprising:

a housing having bore means therein and pressurizing piston means sealingly and reciprocably received in said bore means and cooperating therewith to define a plurality of brake fluid pressurizing chambers for pressurizing brake fluid when said master cylinder assembly is actuated to actuate the vehicle front wheel brakes through the brake lines connected therewith and additional pressurizing chambers for pressurizing brake fluid to actuate the vehicle rear wheel brakes through the brake lines connected therewith;

a plurality of proportioning valve means mounted in said pressurizing piston means and responsive to some brake fluid pressures generated in said brake fluid pressurizing chambers when said master cylinder assembly is actuated to proportion the brake actuating pressures transmitted to the vehicle rear wheel brakes in relation to other brake fluid pressures generated in said brake fluid pressurizing chambers whereby the vehicle rear wheel brakes receive proportionately less brake actuating pressures than do the vehicle front wheel brakes above an effective predetermined pressure;

and pressure differential sensing means responsive to pressures in at least one chamber of each of said pluralities of brake fluid pressurizing chambers and actuatable upon an increase in the pressure differential acting thereacross when the pressure differential exceeds a predetermined value to render inoperative one of said proportioning valve means not associated with the brake fluid pressurizing chamber having the lower pressure contributing to the pressure differential increase, whereby brake actuating fluid pressure normally proportioned therethrough to a lesser value is transmitted therethrough without being proportioned to a lesser value.

3. In a vehicle brake system having a pair of front brakes and a pair of rear brakes and a brake line connected with each of said brakes, a master cylinder assembly comprising:

a housing having a bore therein, first and second pressurizing pistons in said bore and defining therewith a first pressurizing chamber connected with one of said rear brakes through a first one of said brake lines, a second pressurizing chamber connected with one of said front brakes diagonally opposite said one rear brake through a second one of said brake lines, a third pressurizing chamber connected with the other of said front brakes through a third one of said brake lines, and a fourth pressurizing chamber connected with the other of said rear brakes diagonally opposite said other front brake through a fourth one of said brake lines, said second and third pressurizing chambers pressurizing fluid at a faster rate than said first and fourth pressurizing chambers for a given stroke of said pressurizing pistons, first proportioning valve means responsive to pressures generated in said first and second chambers to act at and above a predetermined pressure differential between said pressures to proportion pressure from said second chamber to said first chamber and to act below said predetermined pressure differential to fluid connect said first and second chambers to tend to equalize the pressures therein, second proportioning valve means responsive to pressures generated in said third and fourth chambers to act at and above a predetermined pressure differential between said pressures to proportion the pressure from said third chamber to said fourth chamber and to act below said last named predetermined pressure differential to fluid connect said third and fourth chambers to tend to equalize pressures therein, and means responsive to the pressure differentials between said second and third chambers and acting upon a pressure decrease of a predetermined amount in one of said second and third chambers relative to the pressure in the other of said second and third chambers to open the one of said first and second proportioning valve means associated with said other chamber of said second and third chambers to render that one proportioning valve means inoperative to proportion and thereby permitting full unproportioned pressure to be delivered to one front brake and one diagonally opposite rear brake.

* * * * *